US012718008B2

(12) United States Patent
Chen

(10) Patent No.: US 12,718,008 B2
(45) Date of Patent: Aug. 25, 2026

(54) TABLE PROCESSING METHOD AND APPARATUS, ELECTRONIC DEVICE, MEDIUM AND PROGRAM PRODUCT

(71) Applicant: Beijing Zitiao Network Technology Co., Ltd., Beijing (CN)

(72) Inventor: Yingyuan Chen, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/518,062

(22) Filed: Nov. 22, 2023

(65) Prior Publication Data

US 2024/0086631 A1 Mar. 14, 2024

Related U.S. Application Data

(63) Continuation of application No. PCT/CN2022/127991, filed on Oct. 27, 2022.

(30) Foreign Application Priority Data

Oct. 27, 2021 (CN) ........................ 202111257767.9

(51) Int. Cl.
*G06F 40/177* (2020.01)

(52) U.S. Cl.
CPC ................................ *G06F 40/177* (2020.01)

(58) Field of Classification Search
CPC .................................................... G06F 40/177

(Continued)

(56) References Cited

U.S. PATENT DOCUMENTS

2008/0270884 A1* 10/2008 Rehm .................. G06F 3/0482 715/224
2013/0115927 A1* 5/2013 Gruber .................... H04W 4/16 455/414.1

(Continued)

FOREIGN PATENT DOCUMENTS

CN 1293780 A 5/2001
CN 101821709 A 9/2010

(Continued)

OTHER PUBLICATIONS

Leila Gharani (Excel IF Formula: Simple to Advanced (multiple criteria, nested If, And, Or functions), published Nov. 2018, pp. 1) (Year: 2018).*

(Continued)

*Primary Examiner* — Stephen S Hong
*Assistant Examiner* — Ahamed I Nazar
(74) *Attorney, Agent, or Firm* — Astute IP Law Group

(57) ABSTRACT

A table processing method and apparatus, an electronic device, a medium and a program product are provided. The method includes: in response to an operation for a target control in an online table, displaying a workflow interface; receiving a trigger condition and a trigger operation in the workflow interface, wherein the trigger condition is associated with data content of the online table or a time, and the trigger operation is associated with the data content of the online table or a target object; if the trigger condition is triggered based on a preset time, executing the trigger operation according to the preset time; or, if the trigger condition is triggered based on a time recorded in the online table, executing the trigger operation according to the time recorded in the online table.

12 Claims, 8 Drawing Sheets

(58) Field of Classification Search
USPC .......................................................... 715/227
See application file for complete search history.

(56) References Cited

U.S. PATENT DOCUMENTS

| | | | | |
|---|---|---|---|---|
| 2018/0039926 | A1* | 2/2018 | Karlson | G06Q 10/06316 |
| 2020/0151630 | A1* | 5/2020 | Shakhnovich | G06Q 10/063 |
| 2020/0226117 | A1 | 7/2020 | Mutalik Desai | |
| 2021/0150480 | A1 | 5/2021 | Haramati et al. | |
| 2023/0028278 | A1* | 1/2023 | Gunda | G06F 9/452 |

FOREIGN PATENT DOCUMENTS

| | | | |
|---|---|---|---|
| CN | 102521407 | A | 6/2012 |
| CN | 104348653 | A | 2/2015 |
| CN | 106462815 | A | 2/2017 |
| CN | 108885771 | A | 11/2018 |
| CN | 109670159 | A | 4/2019 |
| CN | 109948134 | A | 6/2019 |
| CN | 110096688 | A | 8/2019 |
| CN | 110199511 | A | 9/2019 |
| CN | 111258895 | A | 6/2020 |
| CN | 111401849 | A | 7/2020 |
| CN | 111813391 | A | 10/2020 |
| CN | 111931464 | A | 11/2020 |
| CN | 111966734 | A | 11/2020 |
| CN | 112036736 | A | 12/2020 |
| CN | 112069189 | A | 12/2020 |
| CN | 112131832 | A | 12/2020 |
| CN | 112256999 | A | 1/2021 |
| CN | 112433712 | A | 3/2021 |
| CN | 112558957 | A | 3/2021 |
| CN | 112632931 | A | 4/2021 |
| CN | 112632942 | A | 4/2021 |
| CN | 112699151 | A | 4/2021 |
| CN | 112732232 | A | 4/2021 |
| CN | 112785242 | A | 5/2021 |
| CN | 112965988 | A | 6/2021 |
| CN | 113342811 | A | 9/2021 |
| CN | 113900561 | A | 1/2022 |
| JP | H10143574 | A | 5/1998 |

OTHER PUBLICATIONS

CN113900561B, published Jul. 25, 2023, pp. 1-56. (Year: 2023).*
International Search Report in PCT/CN2022/127991, mailed Jan. 18, 2023, 5 pages.
Office Action in CN202111257767.9, mailed Mar. 25, 2023, 9 pages.
Notice of Allowance in CN202111257767.9, mailed Jun. 30, 2023, 5 pages.
Extended European Search Report for European Patent Application No. 22886078.9, mailed on Oct. 24, 2024, 8 pages.
Communication pursuant to Rules 70(2) and 70a(2) EPC for European Application No. 22886078.9, mailed Nov. 12, 2024, 1 page.
Notice of Reasons for Refusal for Japanese Patent Application No. 2023-577614, mailed on Nov. 5, 2024, 12 pages.

* cited by examiner

TABLE PROCESSING METHOD AND APPARATUS, ELECTRONIC DEVICE, MEDIUM AND PROGRAM PRODUCT

CROSS-REFERENCE TO RELATED APPLICATIONS

The present application is a Continuation of PCT Application Serial No. PCT/CN2022/127991, filed Oct. 27, 2022, which claims the priority of Chinese Patent Application 202111257767.9, filed in on Oct. 27, 2021, and entitled "Table Processing Method and Apparatus, Electronic Device, Medium and Program Product", the disclosures of which are incorporated herein by reference in their entireties.

FIELD

The present application relates to the technical field of computers, and in particular, to a table processing method and apparatus, an electronic device, a medium and a program product.

BACKGROUND

At present, a database table product may provide a user-defined setting rule for a user, the rule may contain a trigger condition and a trigger operation, and when the trigger condition is met, a specified trigger operation may be automatically executed. For example, the database table can remind a specified person to modify a corresponding record in the table before the arrival of a deadline, so that the database table can be suitable for scenarios such as task/order management. However, for special scenarios, the above method is not applicable.

SUMMARY

In order to solve the above technical problems or at least partially solve the above technical problems, the present application provides a table processing method and apparatus, an electronic device, a medium and a program product.

According to a first aspect of the present application, provided is a table processing method, including:

in response to an operation for a target control in an online table, displaying a workflow interface;

receiving a trigger condition and a trigger operation in the workflow interface, wherein the trigger condition is associated with data content of the online table or a time, and the trigger operation is associated with the data content of the online table or a target object;

if the trigger condition is triggered based on a preset time, executing the trigger operation according to the preset time; or, if the trigger condition is triggered based on a time recorded in the online table, executing the trigger operation according to the time recorded in the online table.

Optionally, after receiving the trigger condition and the trigger operation in the workflow interface, the method further includes:

if the trigger condition is triggered based on the update of the data content recorded in the online table, executing the trigger operation in the case that the data content recorded in the online table is updated.

Optionally, the trigger operation includes an operation of sending a message;

the step of executing the trigger operation includes:

sending a preset message to the target object in a pre-associated instant messaging application, wherein the target object includes a target user and/or a target group.

Optionally, the step of executing the trigger operation according to the time recorded in the online table includes:

determining a trigger time according to the time recorded in the online table and a preset target time period in the trigger condition; and executing the trigger operation at the arrival of the trigger time.

Optionally, the workflow interface includes a first area for displaying a condition control and a second area for displaying an operation control.

Optionally, the first area displays at least one condition control corresponding to preset trigger conditions;

the step of receiving the trigger condition in the workflow interface includes:

in response to a trigger operation for a first target condition control in the condition controls, selecting, from the preset trigger conditions, a trigger condition for triggering based on the time recorded in the table;

in response to a table selection operation, selecting a target table from the online table;

in response to a time field selection operation, selecting a target time field from the target table; or, in response to a selection operation for a second target condition control in the condition controls, selecting, from preset trigger conditions, a trigger condition based on timing trigger; and in response to a time setting operation, setting the preset time.

Optionally, the second area displays at least one operation control corresponding to preset trigger operations; and the step of receiving the trigger operation in the workflow interface includes:

in response to a trigger operation for a target operation control in the operation controls, selecting the trigger operation from the preset trigger operations.

Optionally, after the step of displaying the workflow interface, the method further includes:

in response to a trigger operation for the condition control in a first control panel in the first area, replacing the first control panel with a second control panel; and in response to a trigger operation for a preset control outside the second control panel, generating a third control panel in the first area, wherein the third control panel and the second control panel have a spatial association relationship in the first area.

Optionally, after the step of displaying the workflow interface, the method further includes:

in response to a trigger operation for the operation control in a fourth control panel in the second area, replacing the fourth control panel with a fifth control panel; and in response to a trigger operation for a preset control outside the fifth control panel, generating a sixth control panel in the second area, wherein the sixth control panel and the fifth control panel have a spatial association relationship in the second area.

Optionally, the condition control in the first area is in an activated state, and the operation control in the second area is in an unactivated state.

Optionally, the method further includes:

in response to the condition control in the first area being triggered, activating the operation control in the second area.

Optionally, the step: in response to the operation for the target control in the online table, displaying the workflow interface, includes:

- in response to a trigger operation for the target control in the online table, displaying a workflow creation interface; and
- in response to a trigger operation for a first creation control or a second creation control in the workflow creation interface, displaying the workflow interface, wherein the first creation control is used for creating a user-defined workflow, and the second creation control is used for creating a preset template workflow.

Optionally, the step: in response to the operation for the target control in the online table, displaying the workflow interface, includes:

- in response to a trigger operation for the target control in the online table, displaying a workflow creation interface, wherein the workflow creation interface is located above an interface of the online table by means of a floating layer; and
- in response to a trigger operation for a preset creation control in the workflow creation interface, replacing the workflow creation interface with the workflow interface.

Optionally, the online table is a database table, which includes one or more data tables, and the data table includes one or more table views.

According to a second aspect of the present application, provided is a table processing apparatus, including:

- a workflow interface displaying module, configured to: in response to an operation for a target control in an online table, display a workflow interface;
- a receiving module, configured to receive a trigger condition and a trigger operation in the workflow interface, wherein the trigger condition is associated with data content of the online table or a time, and the trigger operation is associated with the data content of the online table or a target object;
- a first trigger module, configured to: if the trigger condition is triggered based on a preset time, execute the trigger operation according to the preset time; and
- a second trigger module, configured to: if the trigger condition is triggered based on a time recorded in the online table, execute the trigger operation according to the time recorded in the online table.

Optionally, the apparatus further includes:

- a third trigger module, configured to: if the trigger condition is triggered based on the update of the data content recorded in the online table, execute the trigger operation in the case that the data content recorded in the online table is updated.

Optionally, the trigger operation includes an operation of sending a message; and

- the first trigger module, the second trigger module and the third trigger module execute the trigger operation by means of the following step:
- sending a preset message to the target object in a pre-associated instant messaging application, wherein the target object includes a target user and/or a target group.

Optionally, the second trigger module is specifically configured to: if the trigger condition is triggered based on the time recorded in the online table, determine a trigger time according to the time recorded in the online table and a preset target time period in the trigger condition; and execute the trigger operation at the arrival of the trigger time.

Optionally, the workflow interface includes a first area for displaying a condition control and a second area for displaying an operation control.

Optionally, the first area displays at least one condition control corresponding to preset trigger conditions;

- the receiving module is specifically configured to receive the trigger condition in the workflow interface by means of the following steps:
- in response to a trigger operation for a first target condition control in the condition controls, selecting, from the preset trigger conditions, a trigger condition for triggering based on the time recorded in the table;
- in response to a table selection operation, selecting a target table from the online table;
- in response to a time field selection operation, selecting a target time field from the target table; or,
- in response to a selection operation for a second target condition control in the condition controls, selecting, from the preset trigger conditions, a trigger condition based on timing trigger; and
- in response to a time setting operation, setting the preset time.

Optionally, the second area displays at least one operation control corresponding to preset trigger operations;

- the receiving module is specifically configured to receive the trigger operation in the workflow interface by means of the following step:
- in response to a trigger operation for a target operation control in the operation controls, selecting the trigger operation from the preset trigger operations.

Optionally, the apparatus further includes:

- a first control panel replacement module, configured to: in response to a trigger operation for the condition control in a first control panel in the first area, replace the first control panel with a second control panel; and
- a first control panel generation module, configured to: in response to a trigger operation for a preset control outside the second control panel, generate a third control panel in the first area, wherein the third control panel and the second control panel have a spatial association relationship in the first area.

Optionally, the apparatus further includes:

- a second control panel replacement module, configured to: in response to a trigger operation for the operation control in a fourth control panel in the second area, replace the fourth control panel with a fifth control panel; and
- a second control panel generation module, configured to: in response to a trigger operation for a preset control outside the fifth control panel, generate a sixth control panel in the second area, wherein the sixth control panel and the fifth control panel have a spatial association relationship in the second area.

Optionally, the condition control in the first area is in an activated state, and the operation control in the second area is in an unactivated state.

Optionally, the apparatus further includes:

- a control activation module, configured to: in response to the condition control in the first area being triggered, activate the operation control in the second area.

Optionally, the workflow interface displaying module is specifically configured to: in response to a trigger operation for the target control in the online table, display a workflow creation interface; and in response to a trigger operation for a first creation control or a second creation control in the workflow creation interface, display the workflow interface, wherein the first creation control is used for creating a user-defined workflow, and the second creation control is used for creating a preset template workflow.

Optionally, the workflow interface displaying module is specifically configured to: in response to a trigger operation for the target control in the online table, display a workflow creation interface, wherein the workflow creation interface is located above an interface of the online table by means of a floating layer; and in response to a trigger operation for a preset creation control in the workflow creation interface, replace the workflow creation interface with the workflow interface.

Optionally, the online table is a database table, which includes one or more data tables, and the data table includes one or more table views.

According to a third aspect of the present application, provided is an electronic device, including: a processor, wherein the processor is used for executing a computer program stored in a memory, and the computer program, when executed by the processor, implements the method in the first aspect.

According to a fourth aspect of the present application, provided is a computer-readable storage medium, on which a computer program is stored, wherein the computer program implements the method in the first aspect when executed by a processor.

According to a fifth aspect of the present application, provided is a computer program product, wherein when running on a computer, the computer program product causes the computer to execute the method in the first aspect.

Compared with the prior art, the technical solutions provided in the embodiments of the present application have the following advantages:

a user may set the trigger condition and the trigger operation in the workflow interface corresponding to the online table, the trigger condition may be to trigger based on the time recorded in the online time in addition to triggering based on the preset time, that is, the corresponding trigger operation may be executed according to the time recorded in the online table. For example, the corresponding trigger operation may be executed at the arrival of the time recorded in the online table. Therefore, the setting of the trigger time of the workflow is more flexible, and requirements in more service scenarios can be met, for example, an order expiration reminder, etc.

BRIEF DESCRIPTION OF THE DRAWINGS

The drawings herein are incorporated in and constitute a part of the present specification, illustrate embodiments conforming to the present application, and serve to explain, together with the specification, the principles of the present application.

To illustrate technical solutions in the embodiments of the present application or in the prior art more clearly, a brief introduction on the drawings which are needed in the description of the embodiments or the prior art is given below. Apparently, other drawings may be obtained by those ordinary skilled in the art according to these drawings without any creative effort.

DETAILED DESCRIPTION OF EMBODIMENTS

In order to more clearly understand the above objectives, features and advantages of the present application, the solutions of the present application will be further described below. It should be noted that, in the case of no conflict, the embodiments of the present application and the features in the embodiments may be combined with each other.

Numerous specific details are set forth in the following description to facilitate a thorough understanding of the present application, but the present application may also be implemented in other different manners than that described herein; and obviously, the embodiments in the specification are only a part, but not all, of the embodiments of the present application.

Figure 1:
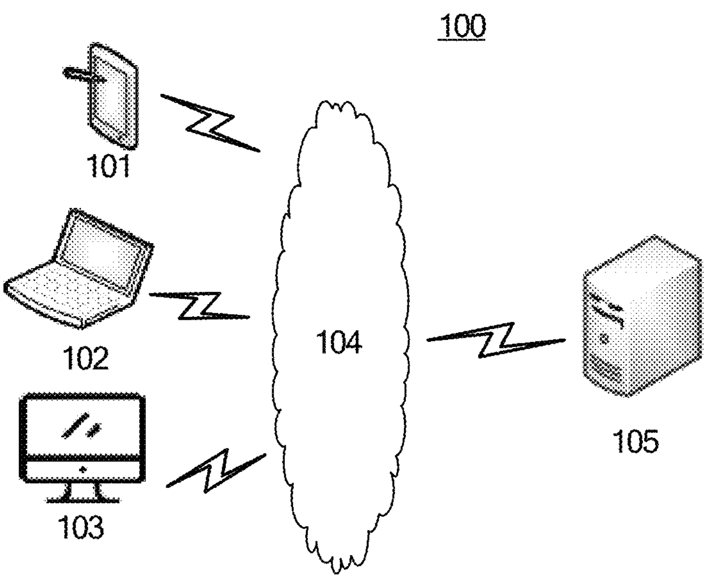
FIG. 1 illustrates a schematic diagram of a system architecture of an exemplary application environment that may be applied to a table processing method according to an embodiment of the present application.

FIG. 1 illustrates a schematic diagram of a system architecture of an exemplary application environment that may be applied to a table processing method according to an embodiment of the present application.

As shown in FIG. 1, the system architecture 100 may include one or more of a terminal device 101, a terminal device 102 and a terminal device 103, a network 104 and a server 105. The network 104 is used for providing a medium of a communication link among the terminal device 101, the terminal device 102, the terminal device 103 and the server 105. The network 104 may include various connection types, such as wired, a wireless communication link, an optical fiber cable, and the like. The terminal device 101, the terminal device 102 and the terminal device 103 may be various electronic devices, including, but not limited to, desktop computers, portable computers, smart phones, tablet computers, and the like. It should be understood that the numbers of terminal devices, networks and servers in FIG. 1 are merely illustrative. According to implementation requirements, there may be any numbers of terminal devices, networks and servers. For example, the server 105 may be a server cluster composed of a plurality of servers, etc.

The table processing method provided in the embodiment of the present application is generally executed by the server 105, and correspondingly, a table processing apparatus may be disposed in the server 105. However, those skilled in the art can easily understand that, the table processing method provided in the embodiment of the present application may also be executed by the terminal device 101, the terminal device 102 and the terminal device 103. For example, the terminal device 101, the terminal device 102 and the terminal device 103 may establish a workflow in advance, wherein the workflow includes a trigger condition and a trigger operation, and upload the workflow to the server 105.

After acquiring the trigger condition and the trigger operation in the workflow, if it is determined that the trigger condition is triggered based on a time recorded in an online table, the server 105 executes the trigger operation according to the time recorded in the online table.

The table processing method provided in the embodiment of the present application will be described in detail below at first.

Figure 2:
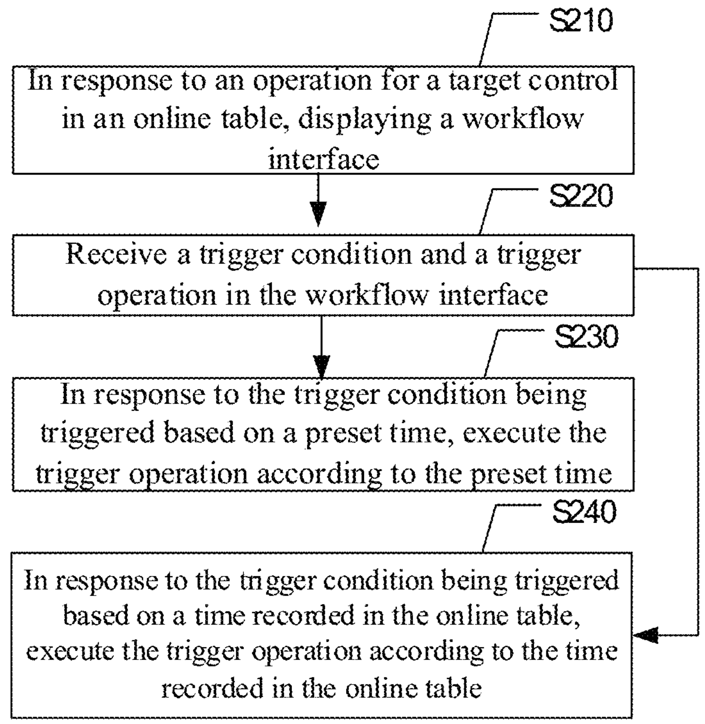
FIG. 2 is a flowchart of a table processing method in an embodiment of the present application.

Referring to FIG. 2, FIG. 2 is a flowchart of a table processing method in an embodiment of the present application, and the method may include the following steps:

Step S210, in response to an operation for a target control in an online table, displaying a workflow interface.

In the embodiment of the present application, the online table is a table that may be edited online, and may support the online editing of one or more people, for example, it may be a database table or the like. The online table may include one or more data tables, which may be located in different sheets, and the data table may include one or more table views. The table view is used for displaying a change condition of data in the data table.

The online table may contain an entry for establishing a workflow, the entry is a target control, and after a user performs a trigger operation on the target control, the workflow interface may be displayed. The workflow refers to an automated workflow of the database table. According to service requirements, the user may establish a workflow meeting the service requirements. A table operation may be specified by the workflow to trigger automatic update of data, automatic sending of a notification reminder, and setting of a timing task, and the like, such that cumbersome manual operations are reduced. Each workflow may include a trigger condition and a trigger operation, and when the trigger condition is met, the corresponding trigger operation may be executed.

Step S220, receiving the trigger condition and the trigger operation in the workflow interface.

In the workflow interface, the user may establish the corresponding trigger condition and trigger operation according to the service requirements. The trigger condition may include a time-type trigger condition and a data change-type trigger condition, the time-type trigger condition is a condition of triggering at the arrival of a preset deadline, and the data change-type trigger condition is a condition of triggering in the case of a data change in the online table. Therefore, the trigger condition may be associated with data content of the online table or a time.

The deadline may be set in the workflow interface, for example, a preset time may be directly set as the deadline, or a time contained in the online table may be used as the deadline, for example, a time field may be selected in the online table, and a time corresponding to the time field is used as the deadline. In this way, the trigger operation may be performed according to a time corresponding to the time field recorded in the online table.

For example, for an order management scenario, an order management data table contains an order expiration time field, and when the workflow is established, the order management data table and the order expiration time field may be selected. In this way, the trigger operation may be directly performed according to a time corresponding to the order expiration time field in the order management data table, and there is no need for the user to set the time in the trigger condition after checking the time corresponding to the order expiration time field in the order management data table, such that the setting process of the trigger time can be simplified. Especially when the time recorded in the online table changes, the setting process of the trigger time can be further simplified.

The trigger operation may include a trigger operation of sending a message to a target object, and an operation of modifying the data in the online table, therefore, the trigger operation is associated with the data content of the online table or the target object. The target object may include a target user and/or a target group. That is, the present application may support to send a message to one or more users, and may also support to send a message to one or more groups.

Step S230, if the trigger condition is triggered based on a preset time, executing the trigger operation according to the preset time.

If the trigger condition is triggered based on the preset time, the trigger operation may be executed at the arrival of the preset time. The preset time may also be used as an intermediate time, a target time period is set when the preset time is set, and a function of triggering ahead of the target time period based on the preset time is provided.

Step S240, if the trigger condition is triggered based on a time recorded in the online table, executing the trigger operation according to the time recorded in the online table.

Similar to executing the trigger operation according to the preset time, the trigger operation may be executed at the arrival of the time recorded in the online table. The time recorded in the online table may also be used as an intermediate time, a capability of triggering ahead of N days, Y hours and M minutes is provided, and N, Y and M are all positive integers.

In the table processing method provided in the embodiment of the present application, the user may set the trigger condition and the trigger operation in the workflow interface corresponding to the online table, the trigger condition may be to trigger based on the time recorded in the online time in addition to triggering based on the preset time, that is, the corresponding trigger operation may be executed according to the time recorded in the online table. For example, the corresponding trigger operation may be executed at the arrival of the time recorded in the online table. Therefore, the setting of the trigger time of the workflow is more flexible, and requirements in more service scenarios can be met, for example, an order expiration reminder, etc.

Figure 3:
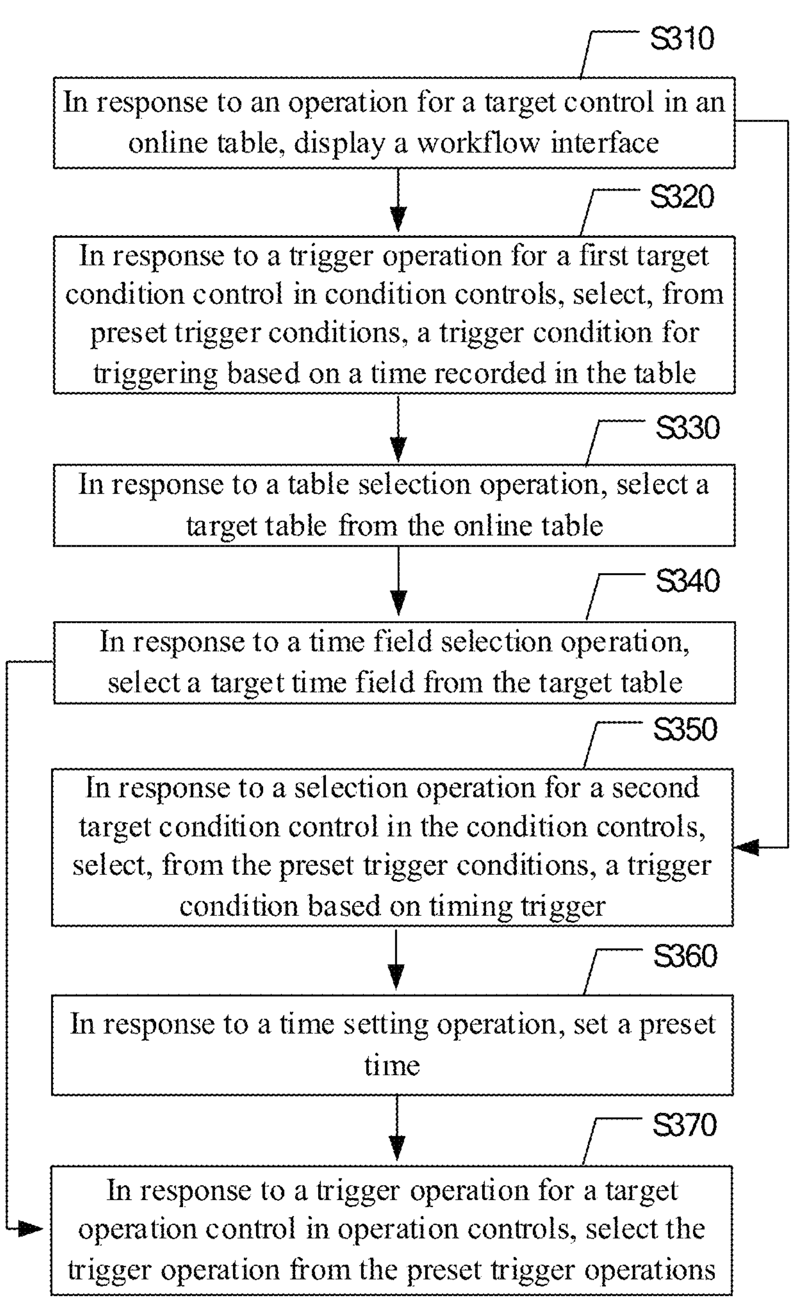
FIG. 3 is a flowchart of establishing a workflow in an embodiment of the present application.

Referring to FIG. 3, FIG. 3 is a flowchart of establishing a workflow in an embodiment of the present application, that is, a flowchart of a method for establishing a workflow in the embodiment shown in FIG. 2, and the method may include the following steps:

Step S310, in response to an operation for a target control in an online table, displaying a workflow interface.

The online table may contain an entry of an automatic workflow, that is, a target control, and the user may enter the workflow interface from the entry. After triggering the target control, the user may directly enter the workflow interface, and may also enter a workflow creation interface at first, and the user enters the workflow interface after performing a trigger operation in the workflow creation interface.

In an optional implementation, in response to a trigger operation for the target control in the online table, a workflow creation interface is displayed; and in response to a trigger operation for a first creation control or a second creation control in the workflow creation interface, the workflow interface is displayed. The first creation control is used for creating a user-defined workflow, and the second creation control is used for creating a preset template workflow.

In the workflow creation interface, a plurality of different preset template workflows may be provided for the user, the different template workflows correspond to different second creation controls, and when the template workflow meets the actual requirements of the user, the user may directly trigger the second creation control to select the corresponding template workflow. When the template workflow does not meet the actual requirements of the user, the user may trigger the first creation control to create a new user-defined workflow. For example, the user creates a new workflow by means of clicking a button of "add a new user-defined flow".

Figure 4A:
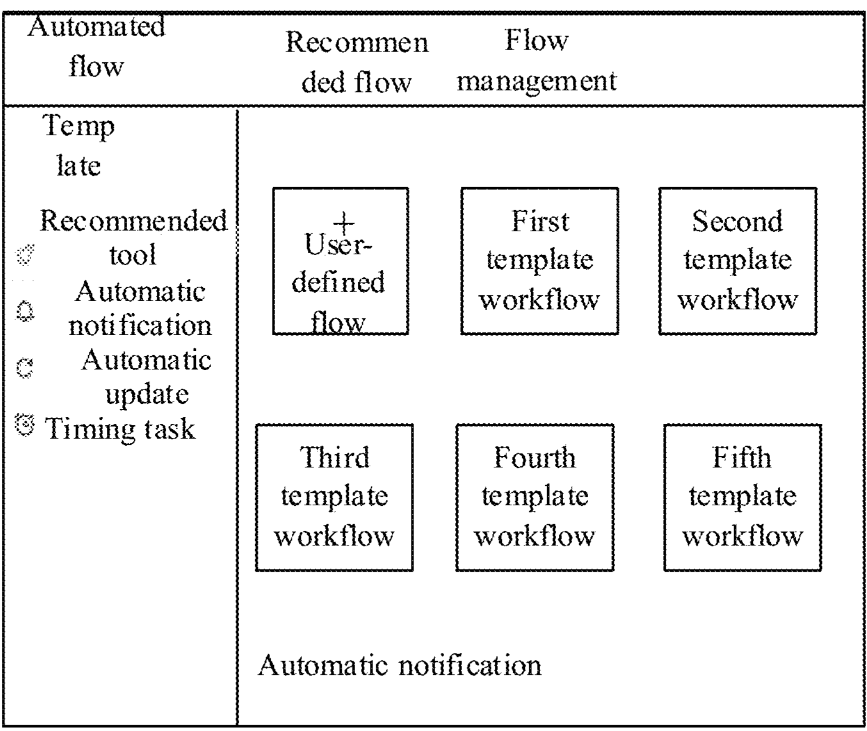
FIG. 4A is a schematic diagram of a workflow creation interface in an embodiment of the present application.

Referring to FIG. 4A, FIG. 4A is a schematic diagram of a workflow creation interface in an embodiment of the present application, wherein the workflow creation interface includes one first creation control for creating a user-defined workflow, and five second creation controls for creating template workflows. The user may select the first creation control or the second creation control according to actual requirements.

In an optional implementation, in response to a trigger operation for the target control in the online table, a workflow creation interface is displayed, wherein the workflow creation interface may be located above an interface of the online table by means of a floating layer. That is, the workflow creation interface may be a newly added independent interface. During a subsequent operation process, the user may update the interface. In response to a trigger operation for a preset creation control in the workflow creation interface, the workflow creation interface is replaced with the workflow interface. The preset creation control may be the first creation control or the second creation control mentioned above.

In the embodiment of the present application, the workflow interface may include a first area for displaying a condition control and a second area for displaying an operation control. The first area may display at least one condition control corresponding to preset trigger conditions, and the second area may display at least one operation control corresponding to preset trigger operations.

Figure 4B:
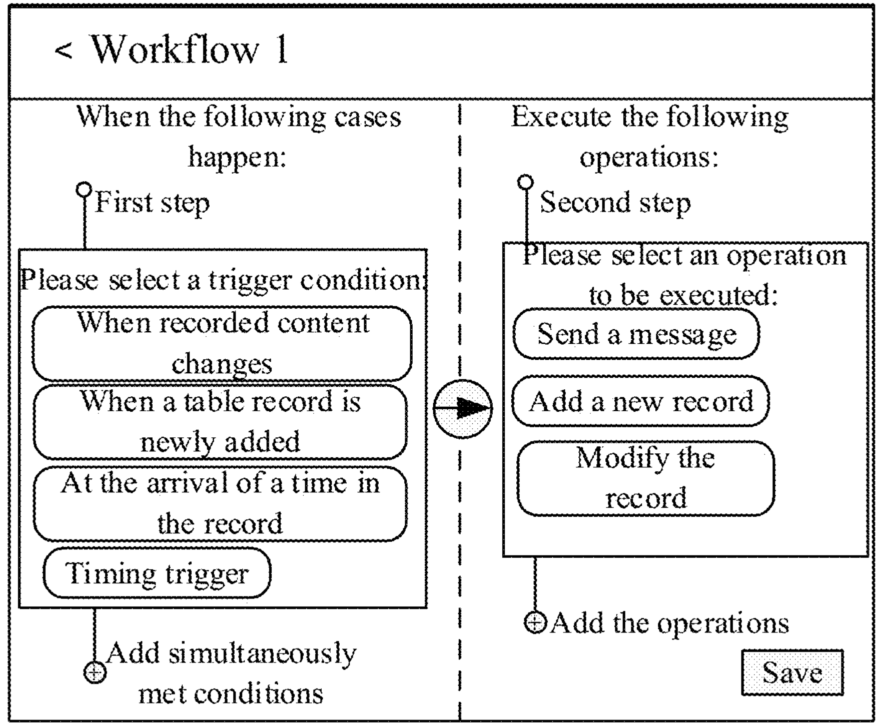
FIG. 4B is a schematic diagram of a workflow interface in an embodiment of the present application.

Referring to FIG. 4B, FIG. 4B is a schematic diagram of a workflow interface in an embodiment of the present application, the workflow interface includes a left area and a right area, the first area is located on the left side, in which for condition controls are displayed, that is, "when recorded content changes", "when a table record is newly added", "at the arrival of a time in the record", and "timing trigger", which respectively correspond to four preset trigger conditions, and the user may select the required trigger condition. The second area is located on the right side, in which three operation controls are displayed, that is, "send a message", "add a new record" and "modify the record", which respectively correspond to three preset trigger operations, and the user may select the required trigger operation. It can be understood that the types and numbers of the condition controls and the operation controls in the workflow interface may not be limited thereto.

Step S320, in response to a trigger operation for a first target condition control in the condition controls, selecting, from preset trigger conditions, a trigger condition for triggering based on the time recorded in the table.

In the embodiment of the present application, the first target condition control is a condition control in the first area, and the corresponding trigger condition is triggered based on the time recorded in the online table, for example, the condition control of "at the arrival of a time in the record" in FIG. 4B is the first target condition control. After the condition control is triggered, a table selection interface may be displayed, and the user may further select a table in the table selection interface.

Step S330, in response to a table selection operation, selecting a target table from the online table.

Step S340, in response to a time field selection operation, selecting a target time field from the target table.

The target table is a table in the online table, and the table contains a time field that the user wants to select. By means of selecting the target table and the target time field, the setting of the trigger condition is completed.

Figure 5:
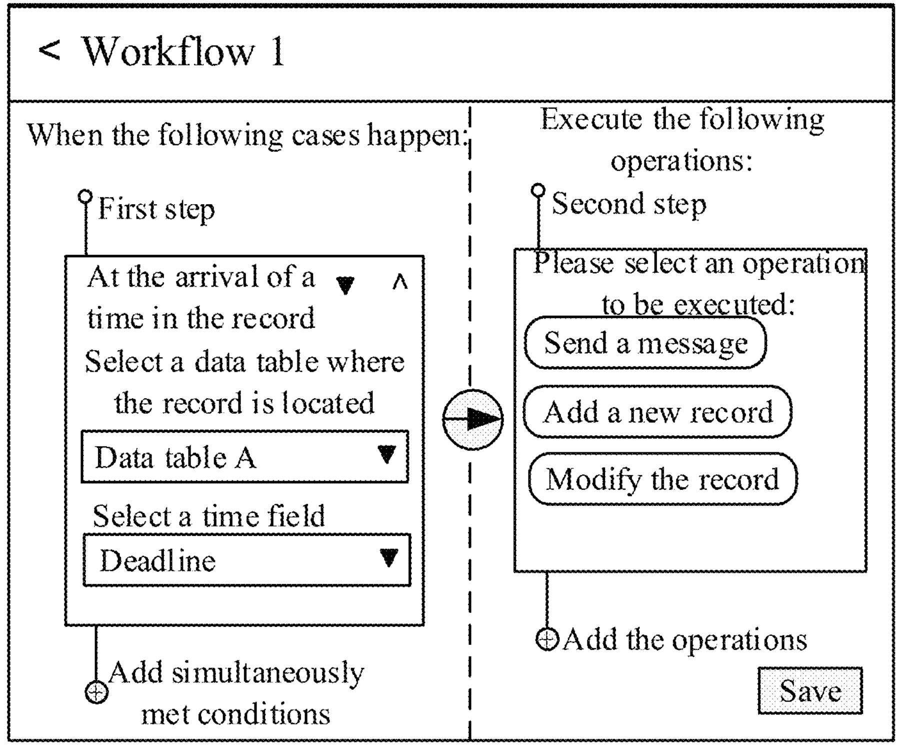
FIG. 5 is another schematic diagram of a workflow interface in an embodiment of the present application.

Referring to FIG. 5, FIG. 5 is another schematic diagram of a workflow interface in an embodiment of the present application, and after the use selects "at the arrival of a time in the record", a table selection button may be displayed. The user may continue to execute the table selection operation, so as to select the target table, that is, a data table A. The user may further select the target time field from the target table, the target time field has a corresponding time, and the target time field shown in FIG. 5 is "deadline".

Step S350, in response to a selection operation for a second target condition control in the condition controls, selecting, from the preset trigger conditions, a trigger condition based on timing trigger.

The user may also trigger the second target condition control, and select a trigger condition of triggering based on the preset time, for example, the condition control of "timing trigger" in FIG. 4B is the second target condition control. Then, the user may further set the preset time.

Step S360, in response to a time setting operation, setting the preset time.

In the embodiment of the present application, when the user sets the trigger condition, the condition control of the first area is in an activated state, and at this time, the operation control in the second area may be in an unactivated state. That is, the user may set the trigger condition first and then set the trigger operation in sequence, so that the trigger operation cannot be set if the trigger condition is not set up.

Step S370, in response to a trigger operation for a target operation control in the operation controls, selecting the trigger operation from the preset trigger operations.

After the trigger condition is determined, the trigger operation may be further selected from the preset trigger operations, that is, the trigger operation in the workflow in the embodiment shown in FIG. 2. Similarly, the trigger operation may be one or more of a plurality of preset trigger operations. For example, the trigger operation may be to modify the record and send a message, that is, the message may be sent while the record is modified.

It can be understood that, when the user operates the controls in the first area and the second area, the interfaces in the first area and the second area may also be updated synchronously. In response to a trigger operation for the condition control in a first control panel in the first area, the first control panel is replaced with a second control panel. For example, as shown in FIG. 5, the first area is located on the left side, a gray area in the first area may be the first control panel, the first control panel includes four condition controls, and after the user executes the trigger operation on any condition control, the first control panel may be updated to the second control panel. Of course, when the user selects different condition controls, the corresponding second control panels are also different.

In the embodiment of the present application, the user may set one preset trigger condition, and may also set a plurality of preset trigger conditions. If a plurality of preset trigger conditions are set, the trigger operation is executed if the plurality of preset trigger conditions are met at the same time. For example, the user may execute the trigger operation on a preset control, so as to set the plurality of preset trigger conditions. In response to a trigger operation for a preset control outside the second control panel, a third control panel is generated in the first area.

For example, as shown in FIG. 5, the first area includes a "+" control, the "+" control is the preset control, and the user may generate the third control panel in the first area by triggering the control, wherein the third control panel and the second control panel may have a spatial association relationship in the first area. In this way, the user may respectively select the preset trigger conditions in the second control panel and the third control panel.

In response to a trigger operation for the operation control in a fourth control panel in the second area, the fourth control panel is replaced with a fifth control panel. In response to a trigger operation for a preset control outside the fifth control panel, a sixth control panel is generated in the second area, and the sixth control panel and the fifth control panel have a spatial association relationship in the second area.

It should be noted that the update of the control panel in the second area is similar to the update of the control panel in the first area, reference may be specifically made to the update of the control panel in the first area, and thus details are not described herein again.

When the workflow is generated, the workflow may be enabled by default, and an "enable" button may also be provided for the user, and after the user clicks the "enable" button, the workflow is enabled. After the workflow is enabled, the trigger operation may be automatically executed according to the trigger condition in the workflow.

Figure 6:
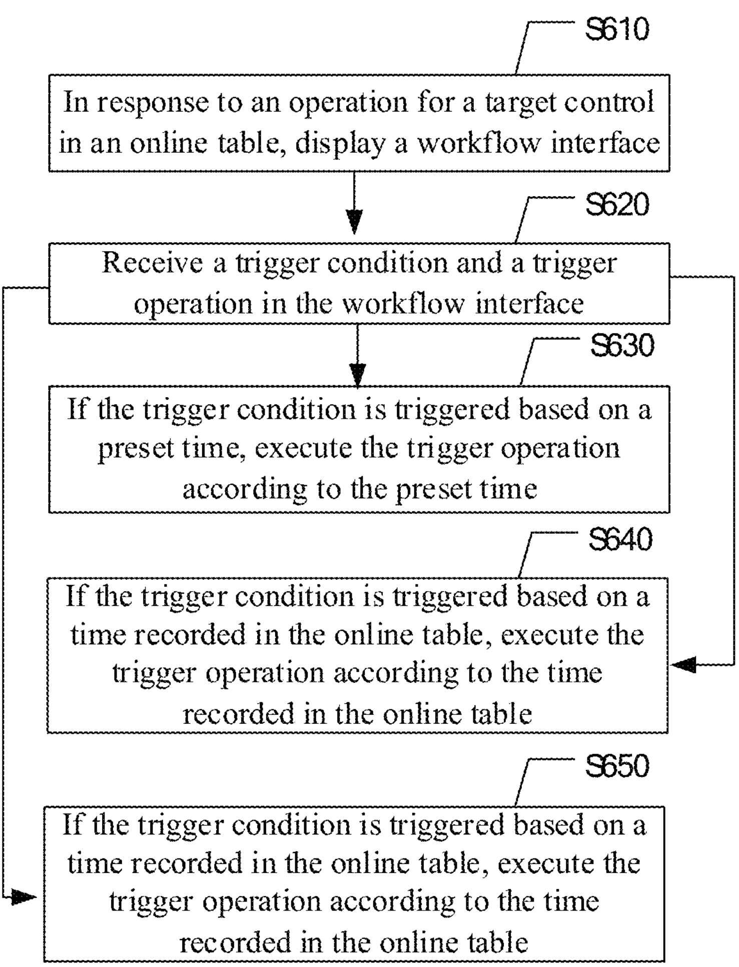
FIG. 6 is another flowchart of a table processing method in an embodiment of the present application.

Referring to FIG. 6, FIG. 6 is another flowchart of a table processing method in an embodiment of the present application, and the method may include the following steps:

Step S610, in response to an operation for a target control in an online table, displaying a workflow interface.

Step S620, receiving a trigger condition and a trigger operation in the workflow interface, wherein the trigger condition is associated with data content of the online table or a time, and the trigger operation is associated with the data content of the online table or a target object.

Step S630, if the trigger condition is triggered based on a preset time, executing the trigger operation according to the preset time.

The above steps S610 to S630 are the same as the steps S210 to S230 in the embodiment shown in FIG. 2, specific reference may be made to the description in the embodiment shown in FIG. 2, and thus details are not described herein again.

Step S640, if the trigger condition is triggered based on a time recorded in the online table, executing the trigger operation according to the time recorded in the online table.

In the embodiment of the present application, the time recorded in the online table may be directly used as a trigger time, and the trigger time may also be determined according to the time recorded in the online table and a preset target time period in the trigger condition; and the trigger operation is executed at the arrival of the trigger time. The target time period may be set in minutes, hours, days, weeks, or months. For example, the time recorded in the online table is 8:00 on October 12th, and the target time period is 5 minutes, then the trigger operation may be executed at 7:55 on October 12th. The trigger operation may also be executed at 8:05 on October 12th. That is, according to actual requirements, the trigger operation may be executed in advance, and the trigger operation may also be executed after a delay.

Figure 7:
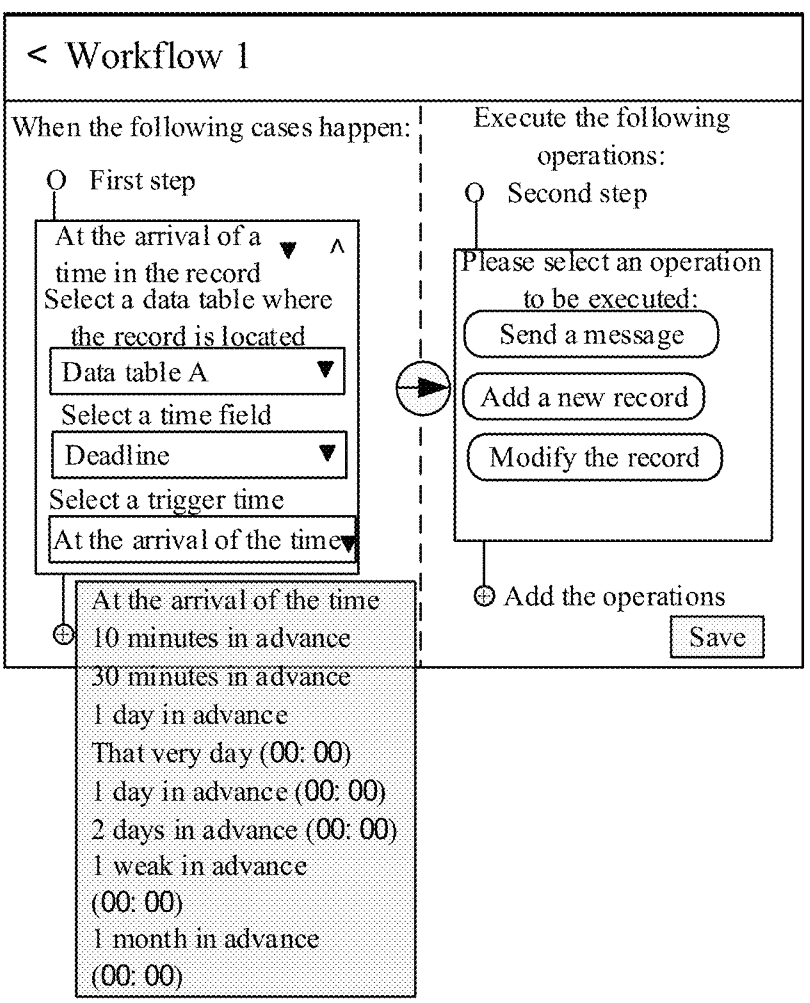
FIG. 7 is still another schematic diagram of a workflow interface in an embodiment of the present application.

Referring to FIG. 7, FIG. 7 is still another schematic diagram of a workflow interface in an embodiment of the present application. The user may use, as the trigger time, a time corresponding to a target time field, or, select a target time period to be advanced or delayed. It should be noted that, if the time corresponding to the target time field is relatively accurate, for example, being accurate to minutes or hours, the set trigger time may be the arrival of the time recorded in the online table, or the arrival of a time after the target time period is advanced or delayed. If the time corresponding to the target time field is less accurate, a specified trigger time may be set, for example, may be a what time and minutes on that day, or what time and minutes after the target time period is advanced or delayed.

Step S650, if the trigger condition is triggered based on the update of the data content recorded in the online table, executing the trigger operation in the case that the data content recorded in the online table is updated.

The step S630 and the step S640 both belong to time-type trigger conditions, and the present application also provides a data change-type class trigger condition. When a workflow is established, the user may select the data change-type class trigger condition, for example, the user may select "when recorded content changes" or "when a new table record is added" in FIG. 4B. The update of the data content recorded in the online table may also include deleting the table record or the like in addition to changing the recorded content and adding a new table record.

If the trigger condition is triggered based on the update of the data recorded in the online table, the trigger operation is "add a new record" or "modify the record", and a table corresponding to the trigger condition and a table corresponding to the trigger operation may be different tables. For example, when the data content in a table A changes, it may be triggered to modify the data content in a table B, or it is triggered to add new data content in a table C, etc.

In the embodiment of the present application, the trigger operation may include an operation of sending a message, and optionally, a preset message may be sent to the target object in a pre-associated instant messaging application, wherein the target object includes a target user and/or a target group. That is, the present application may support to select a user and a group as sending objects. If the sending object is the target group, the preset message will be sent to each user in the target group. When the users in the target group are increased or decreased, when the preset message is sent, the latest member list in the target group at the time of trigger shall prevail, and there is no need for the user to manually adjust the sending objects.

Figure 8:
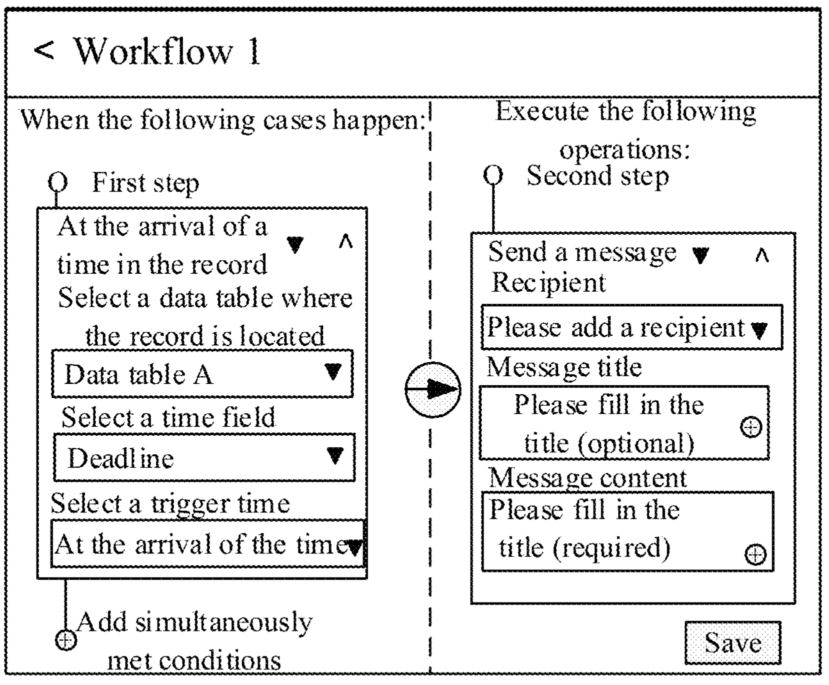
FIG. 8 is still another schematic diagram of a workflow interface in an embodiment of the present application.

Referring to FIG. 8, FIG. 8 is still another schematic diagram of a workflow interface in an embodiment of the present application. If the trigger operation is the operation of sending the message, when a workflow is established, after selecting "send a message" from the plurality of preset trigger operations, the user may further set the sending object and the sent preset message. In response to a selection operation executed by the user in the workflow interface for the target object in the instant messaging application, the target object is selected; and in response to a message editing operation executed by the user in the workflow interface, the preset message is edited and generated.

When the target object is selected, the target object may be directly selected from the instant messaging application, or a person field may also be selected from the table, and a person name of a user corresponding to the person field may be the same as a person name of the user in the instant messaging application.

In the table processing method of the embodiment of the present application, the trigger condition in the pre-established workflow may be to trigger based on the time recorded in the online table, that is, the corresponding trigger operation may be executed according to the time recorded in the online table. For example, the corresponding trigger operation may be executed at the arrival of the time recorded in the online table. Or, the time recorded in the online table may also be used as an intermediate time, a capability of performing trigger after a preset time period is advanced or delayed is provided. Therefore, the setting of the trigger time of the workflow is more flexible, and requirements in more service scenarios can be met, for example, an order expiration reminder, etc. When the trigger operation is the operation of sending the message, the preset message may be sent to the sending object in a group dimension, so that the problem of manually adding each user one by one when a notification message is sent in large scale is solved. Moreover, when the group personnel changes, the sending object does not need to be manually modified, thereby avoiding the problems of untimely information synchronization and information leakage caused by untimely change of the sending object.

Figure 9:
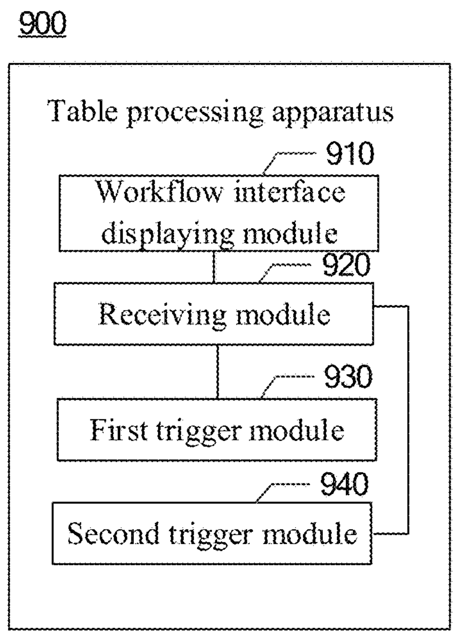
FIG. 9 is a schematic structural diagram of a table processing apparatus in an embodiment of the present application.

Corresponding to the above method embodiments, an embodiment of the present application further provides a table processing apparatus, and referring to FIG. 9, the table processing apparatus 900 includes:

- a workflow interface displaying module 910, configured to: in response to an operation for a target control in an online table, display a workflow interface;
- a receiving module 920, configured to receive a trigger condition and a trigger operation in the workflow interface, wherein the trigger condition is associated with data content of the online table or a time, and the trigger operation is associated with the data content of the online table or a target object;
- a first trigger module 930, configured to: if the trigger condition is triggered based on a preset time, execute the trigger operation according to the preset time; and
- a second trigger module 940, configured to: if the trigger condition is triggered based on a time recorded in the online table, execute the trigger operation according to the time recorded in the online table.

Optionally, the table processing apparatus 900 further includes:

- a third trigger module, configured to: if the trigger condition is triggered based on the update of the data content recorded in the online table, execute the trigger operation in the case that the data content recorded in the online table is updated.

Optionally, the trigger operation includes an operation of sending a message; and

- the first trigger module 930, the second trigger module 940 and the third trigger module execute the trigger operation by means of the following step:
- sending a preset message to the target object in a pre-associated instant messaging application, wherein the target object includes a target user and/or a target group.

Optionally, the second trigger module 940 is specifically configured to: if the trigger condition is triggered based on the time recorded in the online table, determine a trigger time according to the time recorded in the online table and a preset target time period in the trigger condition; and execute the trigger operation at the arrival of the trigger time.

Optionally, the workflow interface includes a first area for displaying a condition control and a second area for displaying an operation control.

Optionally, the first area displays at least one condition control corresponding to preset trigger conditions;

- the receiving module 920 is specifically configured to receive the trigger condition in the workflow interface by means of the following steps:
- in response to a trigger operation for a first target condition control in the condition controls, selecting, from the preset trigger conditions, a trigger condition for triggering based on the time recorded in the table;
- in response to a table selection operation, selecting a target table from the online table;
- in response to a time field selection operation, selecting a target time field from the target table; or,
- in response to a selection operation for a second target condition control in the condition controls, selecting, from the preset trigger conditions, a trigger condition based on timing trigger; and
- in response to a time setting operation, setting the preset time.

Optionally, the second area displays at least one operation control corresponding to preset trigger operations;

- the receiving module 920 is specifically configured to receive the trigger operation in the workflow interface by means of the following step:
- in response to a trigger operation for a target operation control in the operation controls, selecting the trigger operation from the preset trigger operations.

Optionally, the table processing apparatus 900 further includes:

- a first control panel replacement module, configured to: in response to a trigger operation for the condition control in a first control panel in the first area, replace the first control panel with a second control panel; and
- a first control panel generation module, configured to: in response to a trigger operation for a preset control outside the second control panel, generate a third control panel in the first area, wherein the third control panel and the second control panel have a spatial association relationship in the first area.

Optionally, the table processing apparatus 900 further includes:

- a second control panel replacement module, configured to: in response to a trigger operation for the operation control in a fourth control panel in the second area, replace the fourth control panel with a fifth control panel; and
- a second control panel generation module, configured to: in response to a trigger operation for a preset control outside the fifth control panel, generate a sixth control panel in the second area, wherein the sixth control panel and the fifth control panel have a spatial association relationship in the second area.

Optionally, the condition control in the first area is in an activated state, and the operation control in the second area is in an unactivated state.

Optionally, the table processing apparatus 900 further includes:

a control activation module, configured to: in response to the condition control in the first area being triggered, activate the operation control in the second area.

Optionally, the workflow interface displaying module 910 is specifically configured to: in response to a trigger operation for the target control in the online table, display a workflow creation interface; and in response to a trigger operation for a first creation control or a second creation control in the workflow creation interface, display the workflow interface, wherein the first creation control is used for creating a user-defined workflow, and the second creation control is used for creating a preset template workflow.

Optionally, the workflow interface displaying module 910 is specifically configured to: in response to a trigger operation for the target control in the online table, display a workflow creation interface, wherein the workflow creation interface is located above an interface of the online table by means of a floating layer; and in response to a trigger operation for a preset creation control in the workflow creation interface, replace the workflow creation interface with the workflow interface.

Optionally, the online table is a database table, which includes one or more data tables, and the data table includes one or more table views.

The specific details of various modules or units in the apparatus have been described in detail in the corresponding method, and thus details are not described herein again.

It should be noted that, although several modules or units of a device for action execution are mentioned in the above detailed description, such division is not mandatory. Indeed, according to the embodiments of the present application, the features and functions of the two or more modules or units described above may be embodied in one module or unit. Conversely, the features and functions of one module or unit described above may be further divided into a plurality of modules or units for implementation.

In an exemplary embodiment of the present application, further provided is an electronic device, including: a processor; and a memory for storing a processor-executable instruction, wherein the processor is configured to execute the table processing method in the present exemplary embodiment.

Figure 10:
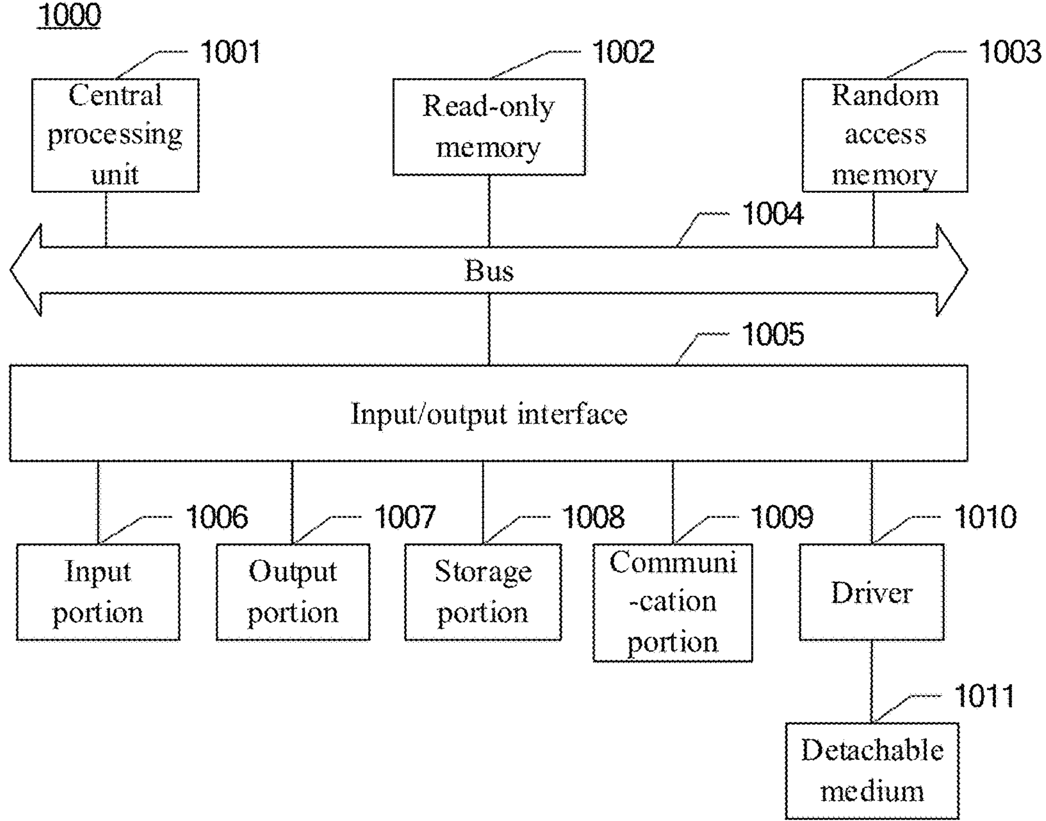
FIG. 10 is a schematic structural diagram of an electronic device in an embodiment of the present application.

FIG. 10 is a schematic structural diagram of an electronic device in an embodiment of the present application. It should be noted that the electronic device 1000 shown in FIG. 10 is merely an example, and should not bring any limitation to the functions and use ranges of the embodiments of the present application.

As shown in FIG. 10, the electronic device 1000 includes a central processing unit (CPU) 1001, which may which may execute various appropriate actions and processes according to a program stored in a read-only memory (ROM) 1002 or a program loaded from a storage portion 1008 into a random access memory (RAM) 1003. In the RAM 1003, various programs and data required for system operations are further stored. The central processing unit 1001, the ROM 1002 and the RAM 1003 are connected to each other by means of a bus 1004. An input/output (I/O) interface 1005 is also connected to the bus 1004.

The following components are connected to the I/O interface 1005: an input portion 1006, including, for example, a keyboard, a mouse, and the like; an output portion 1007, including, for example, a cathode ray tube (CRT), a liquid crystal display (LCD), a speaker, and the like; a storage portion 1008, including, for example, a hard disk, and the like; and a communication portion 1009 of a network interface card, including, for example, a local area network (LAN) card, a modem, and the like. The communication portion 1009 performs communication processing by means of a network such as the Internet. A driver 1010 is also connected to the I/O interface 1005 as needed. A detachable medium 1011, such as a magnetic disk, an optical disk, a magneto-optical disk, a semiconductor memory and the like, is installed on the driver 1010 as needed, so that a computer program read therefrom is installed into the storage portion 1008 as needed.

In particular, according to the embodiments of the present application, the processes described above with reference to the flowcharts may be implemented as computer software programs. For example, the embodiments of the present application include a computer program product, which includes a computer program carried on a computer-readable medium, and the computer program contains program codes for executing the method illustrated by the flowcharts. In such embodiments, the computer program may be downloaded and installed from a network via the communication portion 1009, and/or, installed from the detachable medium 1011. When the computer program is executed by the central processing unit 1001, various functions defined in the apparatus of the present application are executed.

In the embodiments of the present application, further provided is a computer-readable storage medium, on which a computer program is stored, wherein the computer program implements the above table processing method when executed by a processor.

It should be noted that, the computer-readable storage medium described in the present application may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory, a read-only memory, an erasable programmable read-only memory (EPROM or flash memory), an optical fiber, a portable compact disk-read-only memory (CD-ROM), an optical storage device, a magnetic storage device, or any suitable combination of the above. In the present application, the computer-readable storage medium may be any tangible medium that contains or stores a program, wherein the program may be used by or in conjunction with an instruction execution system, apparatus or device. Program codes contained on the computer-readable medium may be transmitted with any suitable medium including, but not limited to: wireless, an electrical wire, an optical cable, radio frequency, and the like, or any suitable combination thereof.

In the embodiments of the present application, further provided is a computer program product, wherein when running on a computer, the computer program product causes the computer to execute the above table processing method.

It should be noted that, in this paper, relational terms, such as "first" and "second", are merely used for distinguishing one entity or operation from another entity or operation, and do not necessarily require or imply that any such actual relationship or order exists between these entities or operations. Moreover, the terms "include", "contain" or any other variants thereof are intended to cover non-exclusive inclusions, such that a process, a method, an article or a device including a series of elements not only includes those elements, but also includes other elements that are not explicitly listed, or also includes elements inherent to such a process, method, article or device. If there are no more restrictions, the element defined by the sentence "including a . . . " does not exclude the existence of other identical elements in the process, the method, the article or the device that includes the element.

The foregoing description is merely a specific implementation of the present application, so that those skilled in the art can understand or implement the present application. Various modifications to these embodiments are apparent to those skilled in the art. Therefore, the present application will not be limited to these embodiments described herein, but is intended to conform to the widest scope consistent with the principles and novel features disclosed herein.

I claim:

1. A table processing method, wherein the method comprises:

in response to an operation for a target control in an online table, displaying a workflow interface for an automated workflow of a database table, wherein the automated workflow is created based on the online table;

receiving, in the workflow interface, a trigger condition and a trigger operation input by a user, wherein the trigger condition is associated with data content of the online table or a time, and the trigger operation is associated with the data content of the online table or a target object, the workflow interface comprises a first area configured for displaying condition control corresponding to the trigger condition;

in response to the trigger condition being triggered based on a preset time, executing the trigger operation according to the preset time; or in response to the trigger condition being triggered based on a time recorded in the online table, executing the trigger operation according to the time recorded in the online table, comprising: determining a trigger time according to the time recorded in the online table and a preset target time period in the trigger condition, and executing the trigger operation at an arrival of the trigger time; or in response to the trigger condition being triggered based on an update of the data content recorded in the online table, executing the trigger operation in a case that the data content recorded in the online table is updated, in response to a trigger operation for the condition control in a first control panel in the first area, replacing the first control panel with a second control panel; and in response to a trigger operation for a preset control outside the second control panel, generating a third control panel in the first area, wherein the third control panel and the second control panel have a spatial association relationship in the first area;

wherein receiving the trigger condition comprises:

receiving a plurality of trigger conditions in response to respective selection operations on the second control panel and the third control panel.

2. The method according to claim 1, wherein the workflow interface further comprises a second area for the trigger operation, the second area is configured for displaying an operation control corresponding to the trigger operation.

3. The method according to claim 2, wherein the first area displays at least one condition control corresponding to preset trigger conditions;

receiving the trigger condition in the workflow interface comprises:

in response to a trigger operation for a first target condition control in the condition controls, selecting, from the preset trigger conditions, a trigger condition for triggering based on the time recorded in the table;

in response to a table selection operation, selecting a target table from the online table;

in response to a time field selection operation, selecting a target time field from the target table; or, in response to a selection operation for a second target condition control in the condition controls, selecting, from the preset trigger conditions, a trigger condition based on timing trigger; and in response to a time setting operation, setting the preset time.

4. The method according to claim 2, wherein the second area displays at least one operation control corresponding to preset trigger operations; and receiving the trigger operation in the workflow interface comprises:

in response to a trigger operation for a target operation control in the operation controls, selecting the trigger operation from the preset trigger operations.

5. The method according to claim 2, wherein after displaying the workflow interface, the method further comprises:

in response to a trigger operation for the operation control in a fourth control panel in the second area, replacing the fourth control panel with a fifth control panel; and in response to a trigger operation for a preset control outside the fifth control panel, generating a sixth control panel in the second area, wherein the sixth control panel and the fifth control panel have a spatial association relationship in the second area.

6. The method according to claim 2, wherein the condition control in the first area is in an activated state, and the operation control in the second area is in an unactivated state.

7. The method according to claim 6, further comprising:

in response to the condition control in the first area being triggered, activating the operation control in the second area.

8. The method according to claim 1, wherein in response to the operation for the target control in the online table, displaying the workflow interface, comprises:

in response to a trigger operation for the target control in the online table, displaying a workflow creation interface; and in response to a trigger operation for a first creation control or a second creation control in the workflow creation interface, displaying the workflow interface, wherein the first creation control is used for creating a user-defined workflow, and the second creation control is used for creating a preset template workflow.

9. The method according to claim 1, wherein in response to the operation for the target control in the online table, displaying the workflow interface, comprises:

in response to a trigger operation for the target control in the online table, displaying a workflow creation interface, wherein the workflow creation interface is located above an interface of the online table by means of a floating layer; and in response to a trigger operation for a preset creation control in the workflow creation interface, replacing the workflow creation interface with the workflow interface.

10. An electronic device, comprising: a processor, wherein the processor is used for executing a computer program stored in a memory, and the computer program, when executed by the processor, implements acts comprising:

in response to an operation for a target control in an online table, displaying a workflow interface for an automated workflow of a database table, wherein the automated workflow is created based on the online table;

receiving, in the workflow interface, a trigger condition and a trigger operation input by a user, wherein the trigger condition is associated with data content of the online table or a time, and the trigger operation is associated with the data content of the online table or a target object, the workflow interface comprises a first area configured for displaying condition control corresponding to the trigger condition;

in response to the trigger condition being triggered based on a preset time, executing the trigger operation according to the preset time; or in response to the trigger condition being triggered based on a time recorded in the online table, executing the trigger operation according to the time recorded in the online table, comprising: determining a trigger time according to the time recorded in the online table and a preset target time period in the trigger condition, and executing the trigger operation at an arrival of the trigger time; or in response to the trigger condition being triggered based on an update of the data content recorded in the online table, executing the trigger operation in a case that the data content recorded in the online table is updated, in response to a trigger operation for the condition control in a first control panel in the first area, replacing the first control panel with a second control panel; and in response to a trigger operation for a preset control outside the second control panel, generating a third control panel in the first area, wherein the third control panel and the second control panel have a spatial association relationship in the first area;

wherein receiving the trigger condition comprises:

receiving a plurality of trigger conditions in response to respective selection operations on the second control panel and the third control panel.

11. A non-transitory computer-readable storage medium, on which a computer program is stored, wherein the computer program, when executed by a processor, implements acts comprising:

in response to an operation for a target control in an online table, displaying a workflow interface for an automated workflow of a database table, wherein the automated workflow is created based on the online table;

receiving a trigger condition and a trigger operation in the workflow interface, wherein the trigger condition is associated with data content of the online table or a time, and the trigger operation is associated with the data content of the online table or a target object, the workflow interface comprises a first area configured for displaying condition control corresponding to the trigger condition;

in response to the trigger condition being triggered based on a preset time, executing the trigger operation according to the preset time; or in response to the trigger condition being triggered based on a time recorded in the online table, executing the trigger operation according to the time recorded in the online table, comprising: determining a trigger time according to the time recorded in the online table and a preset target time period in the trigger condition, and executing the trigger operation at an arrival of the trigger time; or in response to the trigger condition being triggered based on an update of the data content recorded in the online table, executing the trigger operation in a case that the data content recorded in the online table is updated, in response to a trigger operation for the condition control in a first control panel in the first area, replacing the first control panel with a second control panel; and in response to a trigger operation for a preset control outside the second control panel generating a third control panel in the first area, wherein the third control panel and the second control panel have a spatial association relationship in the first area;

wherein receiving the trigger condition comprises:

receiving a plurality of trigger conditions in response to respective selection operations on the second control panel and the third control panel.

12. The method according to claim 1, wherein executing the trigger operation comprises sending a preset message to the target object in a pre-associated instant messaging application, the target object comprises at least one target user and/or at least one target group.

* * * * *